US010552884B2

(12) United States Patent
Lambert et al.

(10) Patent No.: US 10,552,884 B2
(45) Date of Patent: Feb. 4, 2020

(54) CONVERTING DATA FORMATS OF ENTERTAINMENT DATA FEEDS INTO SPECIFIED DATA FORMATS TO FACILITATE PURCHASE

(75) Inventors: Susan Elaine Lambert, Pasadena, CA (US); William Robert Balfour, Toronto (CA); Miroslav Kacmar, Mississauga (CA); Michael Joseph Kasprow, Thornhill (CA); Justin Jolyon Pertschuk, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 280 days.

(21) Appl. No.: 12/987,918

(22) Filed: Jan. 10, 2011

(65) Prior Publication Data
US 2011/0166964 A1    Jul. 7, 2011

Related U.S. Application Data

(63) Continuation of application No. 11/249,517, filed on Oct. 14, 2005, now Pat. No. 78,700,040.

(51) Int. Cl.
*G06Q 30/06* (2012.01)
*G06Q 10/02* (2012.01)

(52) U.S. Cl.
CPC ............. *G06Q 30/06* (2013.01); *G06Q 10/02* (2013.01); *G06Q 30/0613* (2013.01); *G06Q 30/0627* (2013.01); *G06Q 30/0641* (2013.01)

(58) Field of Classification Search
CPC .... G06Q 10/02; G06Q 10/087; G06Q 10/109; G06Q 10/06314; G06Q 30/06–0645;
(Continued)

(56) References Cited

U.S. PATENT DOCUMENTS 4,905,163 A * 2/1990 Garber et al. .................. 706/55
6,738,750 B2   5/2004 Stone et al.
(Continued)

FOREIGN PATENT DOCUMENTS

JP    2002222962      7/2001
KR    2001096682 A  * 11/2001

OTHER PUBLICATIONS

Dialog, "Dialog Pocket Guide," 2001, The Dialog Corporation, p. 30.*
(Continued)

*Primary Examiner* — Adam L Levine
(74) *Attorney, Agent, or Firm* — Esplin & Associates, PC

(57) ABSTRACT

Systems and methods are provided for collecting and listing entertainment ticket information from multiple data sources, and facilitating the sales of entertainment tickets over a network. In accordance with one implementation, a computer-implemented method is provided for offering to sell entertainment tickets over a network. The method includes the steps of providing exhibition data importation rules for importing exhibition data, electronically receiving the exhibition data from multiple exhibition data feeds in accordance with the exhibition data importation rules, and electronically eliminating any duplicates from the exhibition data. The method further includes the step of providing, over the network, to a user a listing of entertainment exhibitions in accordance with user-selected or selected criteria, in which the listing provides an option to purchase an exhibition ticket from an entertainment ticket provider. In the method, the exhibition data may include an entertainment identification information, an entertainment exhibition location, and an entertainment exhibition time.

10 Claims, 7 Drawing Sheets

(58) Field of Classification Search
CPC ........ G06Q 30/08; G06Q 99/00; G06Q 30/02; G06Q 30/0269; G06F 3/0641; G06F 13/387; G06F 17/30477; G06F 17/30489; G06F 17/30569; Y10S 707/954; Y10S 707/99931; Y10S 707/99932; Y10S 707/99933; Y10S 707/99934; Y10S 707/99935; Y10S 707/99936
USPC ................................................ 705/26.1–27.2
See application file for complete search history.

(56) References Cited

U.S. PATENT DOCUMENTS

| | | | | |
|---|---|---|---|---|
| 6,873,969 | B2* | 3/2005 | Stone et al. | 705/5 |
| 7,269,664 | B2* | 9/2007 | Hutsch | G06F 9/541 |
| | | | | 345/672 |
| 2002/0188522 | A1* | 12/2002 | McCall et al. | 705/26 |
| 2004/0138935 | A1 | 7/2004 | Johnson et al. | |
| 2016/0343037 | A1* | 11/2016 | Nicholas | G06Q 30/02 |

OTHER PUBLICATIONS

Guangtian, "A Unified Approach for Specifying Timing Constraints and Composite Events in Active Real Time Database Systems," Proceedings Fourth IEEE Real-Time Technology and Applications Symposium, IEEE Comput. Soc., Los Alamitos, CA, 1998; 10p.*

"Movieticket.com. Movie Theaters. Find the theater closest to you by Zip Code or City", http://www.movietickets.com/house_list.asp?ShowDate=0&SearchZip=22201. (3 pages).

"Movieticket.com AMC Courthouse Plaza 8. Movies, showtimes and tickets", http://www.movietickets.com/house_detail.asp?house_id=1269. (1 page).

"Fandango—Theatres Near 22201", http://www.fandango.com/TheaterListings.aspx?location=22201&source=cityzipsearch. (3 pages).

"Movie Showtimes & Tickets :: Hollywood.com", http://www.hollywood.com/movies/theater_showtimes.aspx. (5 pages).

* cited by examiner

FIG. 5C

CONVERTING DATA FORMATS OF ENTERTAINMENT DATA FEEDS INTO SPECIFIED DATA FORMATS TO FACILITATE PURCHASE

This Application is a continuation of application Ser. No. 11/249,517, filed Oct. 14, 2005, and now U.S. Pat. No. 7,870,040, which is incorporated herein by reference.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Field of the Invention

The present invention generally relates to computerized systems and methods for offering to sell entertainment tickets over a network. More particularly, the invention relates to systems and methods that collect and list entertainment ticket information from multiple data sources, and facilitate the sales of entertainment tickets over a network.

Description of the Related Art

In recent years, the rise of the Internet has led to an increase in the popularity of shopping and purchasing over the Internet. While remote shopping and purchasing has been available for many years in the form of catalogues, shopping channels on broadcast or cable television, or over the telephone, the presentation of information in such an environment is limited and static, and is not user-interactive. The shopper is not able to return to a previous section of the program in order to review information or availability of a product or service. A shopper may only be interested in the availability or a particular aspect of the product or service, but there is no way for the user to choose which information of the product or service are to be reviewed. In addition, it is difficult for the user to increase the speed of the transaction, since the information which is vital for the transaction (e.g., price, terms, availability, etc) is usually not available until the end of the presentation of the product or service.

The Internet has solved some of these problems. Shoppers are able to interact with online catalogues or shopping malls in a variety of ways. The Internet has fewer restrictions and permits a more user guided electronic shopping experience. A user may browse the Internet about upcoming entertainment exhibitions (e.g., movies, concerts, theater, dances, art shows, museum exhibits, sporting events), the user may collect information for the upcoming entertainment exhibitions, such as exhibition locations, exhibition times, ticket and/or space availability, ticket prices, and the like. More importantly, the user may also purchase tickets for the upcoming entertainment exhibitions over the Internet via entertainment ticket providers such as Fandango™ and MovieTickets™. However, such entertainment ticket providers provide incomplete coverage of available ticketable entertainment exhibitions at a single site.

In the view of the foregoing, there is a need for improved solutions for offering to sell entertainment tickets. For example, there is a need for computerized systems and methods that collect and list entertainment ticket information from multiple data sources at a single site, and facilitate the sales of entertainment tickets. Moreover, there is a need for improved systems and methods that provide more flexibility and options to end users.

SUMMARY OF THE INVENTION

Consistent with the principles of the present invention, computerized systems and methods are provided for offering to sell entertainment tickets over a network. In addition, systems and methods consistent with the present invention are provided for collecting and listing entertainment ticket information from multiple data sources, and facilitating the sales of entertainment tickets. Moreover, systems and methods are disclosed for providing more flexibility and options to end users.

According to an embodiment of the invention, a computer-implemented method is provided for offering to sell entertainment tickets over a network. The method comprises the steps of providing exhibition data importation rules for importing exhibition data, electronically receiving the exhibition data from multiple exhibition data feeds in accordance with the exhibition data importation rules, and electronically eliminating any duplicates from the exhibition data. In addition, the method comprises the step of providing, over the network, to a user a listing of entertainment exhibitions in accordance with user-selected or selected criteria, in which the listing provides an option to purchase an exhibition ticket from an entertainment ticket provider. In the method, the exhibition data may include an entertainment identification information, an entertainment exhibition location, and an entertainment exhibition time.

Consistent with another embodiment of the present invention, a computer-readable medium is provided containing instructions for performing a method when the instructions are executed by a processor. The method may offer to sell entertainment tickets over a network. The method comprises the step of providing exhibition data importation rules for importing exhibition data including an entertainment identification information, an entertainment exhibition location, and an entertainment exhibition time. Further, the method comprises the steps of electronically receiving the exhibition data from multiple exhibition data feeds in accordance with the exhibition data importation rules, electronically eliminating any duplicates from the exhibition data and providing, over the network, to a user a listing of entertainment exhibitions in accordance with user-selected or selected criteria, in which the listing provides an option to purchase an exhibition ticket from an entertainment ticket provider.

Consistent with another embodiment of the present invention, a system is provided for offering to sell entertainment tickets over a network. The system comprises a data importation rule module for providing exhibition data importation rules for importing exhibition data and an exhibition data receiving module for electronically receiving the exhibition data from a plurality of exhibition data feeds in accordance with the exhibition data importation rules. The system further comprises a duplicate elimination module for electronically eliminating any duplicates from the exhibition data and a listing module for providing, over the network, to a user a listing of entertainment exhibitions in accordance with user-selected or selected criteria, in which the listing provides an option to purchase an exhibition ticket from an entertainment ticket provider. In the system, the exhibition data may include an entertainment identification information, an entertainment exhibition location, and an entertainment exhibition time.

Consistent with yet another embodiment of the invention, a computer-implemented method and a computer-readable medium containing instructions for performing a method are presented for providing an electronic template for entertainment tickets over a network. The method comprises the step of providing the electronic template for displaying entertainment data for use in a computer-implemented method for offering to sell entertainment tickets, the method for offering to sell comprising the steps of receiving exhibition data from a plurality of exhibition data feeds in accordance with exhibition data importation rules, in which the exhibition data is filtered for any duplicates, and providing, over the network, to a user a listing of entertainment exhibitions in accordance with user-selected or selected criteria, in which the listing provides an option to purchase an exhibition ticket from an entertainment ticket provider. In the method, the entertainment data may include entertainment-specific data corresponding to a specified entertainment and the exhibition data may include an entertainment identification information, an entertainment exhibition location, and an entertainment exhibition time.

Consistent with yet another embodiment of the invention, a system is presented for providing an electronic template for entertainment tickets over a network. The system comprises a template module for providing the electronic template for displaying entertainment data for use in a system for offering to sell entertainment tickets, the system for offering to sell comprising an exhibition data receiving module for receiving exhibition data in accordance with the electronic template, in which the exhibition data is obtained from a plurality of exhibition data feeds in accordance with exhibition data importation rules and the exhibition data is filtered for any duplicates, and a listing module for providing, over the network, to a user a listing of entertainment exhibitions in accordance with user-selected or selected criteria, in which the listing provides an option to purchase an exhibition ticket from an entertainment ticket provider. In the system, the entertainment data may include entertainment-specific data corresponding to a specified entertainment and the exhibition data may include an entertainment identification information, an entertainment exhibition location, and an entertainment exhibition time.

Consistent with a further embodiment of the invention, a computer-implemented method and a computer-readable medium containing instructions for performing a method are presented for providing exhibition data over a network. The method comprises the step of electronically sending the exhibition data for use in a computer-implemented method for offering to sell entertainment tickets, the method for offering to sell comprising the steps of electronically receiving the exhibition data from a plurality of exhibition data feeds in accordance with exhibition data importation rules, electronically eliminating any duplicates from the exhibition data, and providing to a user a listing of entertainment exhibitions in accordance with user-selected or selected criteria, in which the listing provides an option to purchase an exhibition ticket from an entertainment ticket provider. In the method, the exhibition data may include an entertainment identification information, an entertainment exhibition location, and an entertainment exhibition time.

Consistent with a further embodiment of the invention, a system is presented for providing exhibition data over a network. The system comprises an exhibition data sending module for electronically sending the exhibition data for use in a system for offering to sell entertainment tickets, the system for offering to sell comprising an exhibition data receiving module for electronically receiving the exhibition data from a plurality of exhibition data feeds in accordance with exhibition data importation rules, a duplicate elimination module for electronically eliminating any duplicates from the exhibition data, and a listing module for providing to a user a listing of entertainment exhibitions in accordance with user-selected or selected criteria, in which the listing provides an option to purchase an exhibition ticket from an entertainment ticket provider. In the system, the exhibition data may include an entertainment identification information, an entertainment exhibition location, and an entertainment exhibition time.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIGS. 5A-C illustrate exemplary graphical user interfaces (GUIs) for searching for entertainment tickets over a network.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Consistent with embodiments of the present invention, computerized systems and methods are provided for offering to sell entertainment tickets over a network. As used herein, the term "entertainment" refers to any recreational, educational, interactive, or other leisure activity. Examples of entertainment includes movies, concerts, dances, theatre, art shows, museum exhibits, sporting events, theme parks, and the like. An entertainment may have one or more exhibitions. In this disclosure, the terms "exhibition," "show," "showing," "event," and "performance" may be used interchangeably and should not be deemed to limit the scope or applicability of the invention.

As will be appreciated by those skilled in the art, embodiments of the invention can be adapted to offer to sell tickets for entertainment over a network. In one embodiment consistent with the present invention, computerized systems and methods are provided for offering to sell movie tickets over the Internet, by receiving and merging movie showing data from multiple data sources into a single database on a periodic or continuous basis. The systems and methods may eliminate duplicate information in the movie showing data, and provide unique formatting data based on the branding of the movies. The systems and methods allow users to search for theaters at a specified location, select one or more movies, and click on a link or button that takes them to an appropriate 3rd party provider, such as Fandango™ and MovieTickets™, to purchase an advance movie ticket, without having to navigate through multiple sites and pages. The disclosed embodiments and components thereof may be implemented through any suitable combination of hardware, software, and/or firmware.

Figure 1:
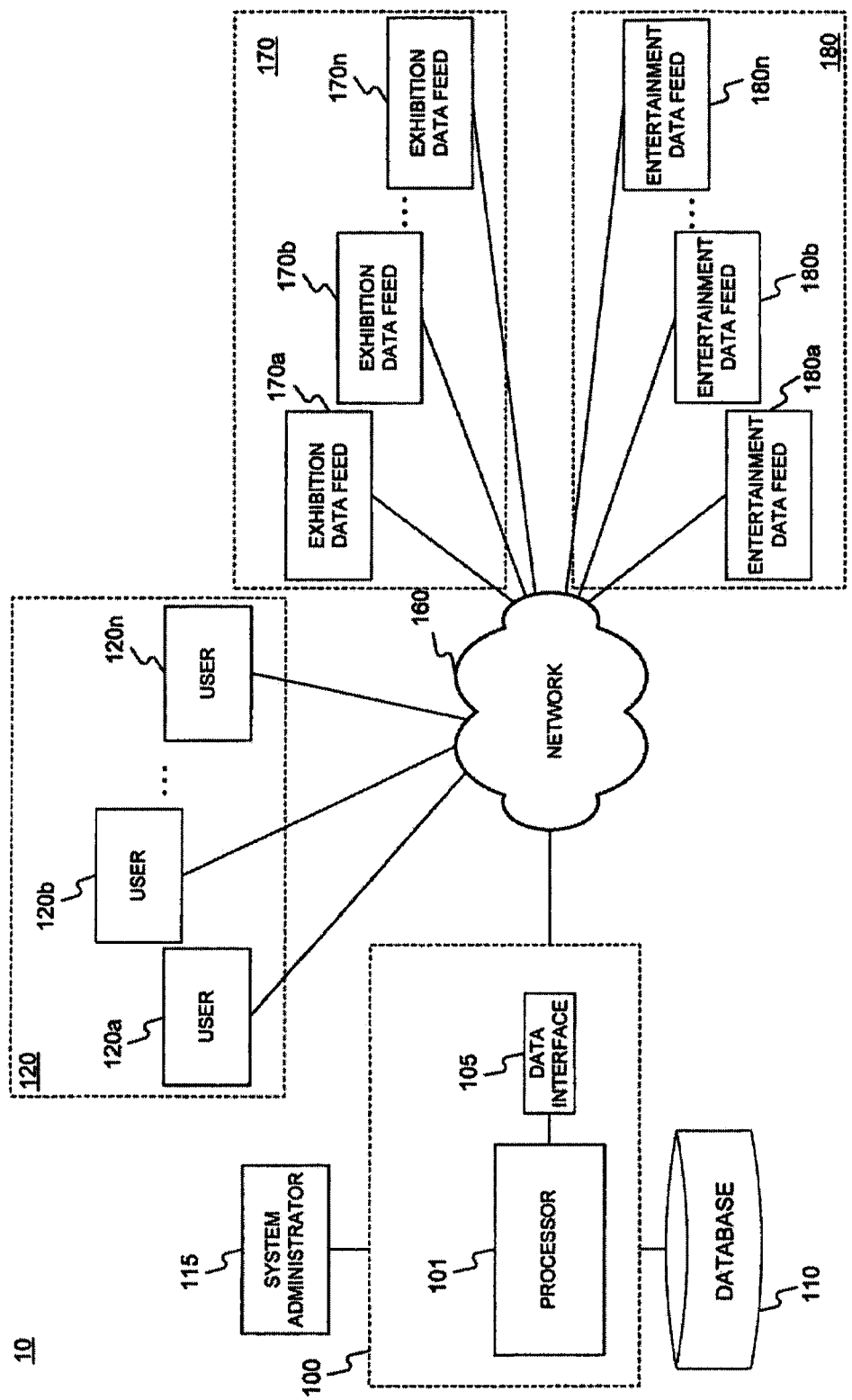
FIG. 1 is a block diagram of an exemplary system configuration for offering to sell entertainment tickets over a network.

FIG. 1 is a block diagram of an exemplary system configuration 10, consistent with the principles of the present invention. The components of system 10 may be adapted to offer to sell entertainment tickets over a network 160 after receiving exhibition data from a plurality of exhibition data feeds 170, and providing a listing of entertainment exhibition to users 120.

As shown in FIG. 1, system 10 includes a server 100 with a processor 101 and, optionally, a data interface 105. Server 100 is connected to a database 110 for storing data, such as exhibition data received from exhibition data feeds 170a-170n (e.g., Tribune Media, Cinema Source), as well as data representing various rules (e.g., data importation rules) and/or other input provided from users 120a-120n. Data from exhibition data feeds 170a-170n and users 120a-120n may be sent to server 100 via a network 160. In addition, entertainment data from entertainment data feeds 180a-180n (e.g., movie studios) may optionally be provided to server 100 via network 160. Each of these components is described in greater detail below.

As will be appreciated by those skilled in the art, the number and orientation of the components illustrated in FIG. 1 are merely are examples and do not limit the scope of the invention. Therefore, other arrangements and sets of components are feasible, consistent with the principles of the invention. Further, it is noted that any combination of the components in system 10 may be owned and/or operated by a service provider. Moreover, several of the components (such as exhibition data feeds 170a-170n, entertainment data feeds 180a-180n, and server 100) may be owned and/or operated by a third party for the purposes of providing data and/or otherwise facilitating the service provider to sell or offer to sell entertainment tickets.

Exhibition data feeds 170a-170n may serve as data sources for providing exhibition data for one or more entertainment. The exhibition data may include entertainment identification information, exhibition location, exhibition time, and other data pertaining to an exhibition. Examples of exhibition data that may be provided by data feeds 170a-170n include movie identification information (e.g., full title, short title, identification number), movie showing locations (e.g., movie theater name, movie theatre ZIP® code), movie showing times. The exhibition data from exhibition data feeds 170a-170n may be sent on a frequent or periodic basis (e.g., daily) to server 100. In one embodiment, exhibition data feeds are sent on a daily basis to provide entertainment exhibition data and/or other updates at the end of a business day or during the evening. In another embodiment, position data feeds are sent hourly, substantially simultaneously, or in real-time. All exhibition data provided by exhibition data feeds 170a-170n may be stored in database 110 or operated upon in real-time.

Users 120a-120n represent end users of system 10. Users 120a-120n having access privileges may be authorized to access restricted features of system 10. Examples of authorized users include analysts, managers, or any users with authority to enter, modify, or delete data importation rules, exhibition data, entertainment data, and/or other data. Access rights and privileges of each authorized user may be controlled by a system administrator 115. Conventional security models and techniques may be used for granting access rights and privileges to users 120a-120n. The rights and privileges of each authorized user may enable the user to access user-traffic data and/or add, modify, or remove data importation rules, exhibition data, entertainment data, and/or other data.

Entertainment data feeds 180a-180n provide entertainment data such as entertainment identification information, entertainment type, entertainment rating, entertainment release date, entertainment price, entertainment branding information, or any other data or information that is desired to be included in the entertainment data. Examples of entertainment data that may be provided by entertainment data feeds 180a-180n and the authorized users include movie identification information (e.g., full title, short title, identification number), movie type (e.g., comedy, drama, documentary), entertainment rating (e.g., "G", "PG", "PG-13", "R"), movie release date, movie price, and movie branding information (e.g., sound clips, background, special characters). Examples of entertainment data feeds include movie studios, such as Time-Warner®, Paramount®, Touchstone®, Miramax®. Data from entertainment data feeds 180a-180n may be stored in database 110 or operated upon in real-time, and used by processor 101 to provide users with information associated with the entertainment.

In operation, server 100 receives data from the various data sources in system 10 (i.e., authorized users, exhibition data feeds 170a-170n, and/or entertainment data feeds 180a-180n). The received data may be filtered, mapped, and/or otherwise processed in accordance to data importation rules prior to processing by processor 101 or storage in database 110. For example, as described below, a data interface 105 may be provided to filter and map data from exhibition data feeds 170a-170n, and/or entertainment data feeds 180a-180n. Such processing may normalize the data, eliminate duplicates in the data, and catch exceptions or errors. Subsequent to the processing of entertainment and/or exhibition data, processor 101 may list the exhibition data to users 120a-n. In one embodiment, the exhibition data is electronically presented to users 120a-120n via a customized graphical user interface having an entertainment-specific interface (e.g., movie sound clips, movie background, movie special characters).

The components shown in FIG. 1, including server 100, database 110, a system administrator 115, users 120a-120n, exhibition data feeds 170a-170n, and entertainment data feeds 180a-180n, may comprise a computing device or platform, such as a computer, laptop, server, mainframe, and the like. By way of example, such a computing device may include a central processing unit (CPU), a disk drive, a memory, and/or a network access device. Further, server 100 may be embodied as a central server (as represented in FIG. 1) or any number of distributed servers (not shown), and may comprise software applications or modules for implementing processor 101 and data interface 105.

The CPU of a computing device may be any appropriate processor or set of processors for executing program instructions. Memory may be RAM or any another permanent, semi-permanent, or temporary storage device, including ROM and flash memory. Disk drives may comprise a hard disk drive, an optical drive, or any other type of data storage device.

The network access device of a computing device may be a modem, a cable modem, an Ethernet card, a T1 line connector, or any other access device for connecting a respective system component (e.g., server 100, database 110, system administrator 115, users 120, exhibition data feeds 170, entertainment data feeds 180) to another system component or connecting a respective system component directly to network 160. Network 160 may be any combination of wired or wireless networks for facilitating the electronic communication of data. By way of example, network 160 may comprise a private network, such as a local-area network, or a wide-area network, and/or a public network, such as the Internet. Further, conventional protocols and encryption methods may be utilized for electronically transmitting data over or to and from network 160. For example, http or ftp protocols may be used for data transfers, and encryption may be achieved through secure ftp or secure copy.

Although not shown, each of the computing devices in FIG. 1 may be connected to one or more input devices, such as a keyboard, a mouse, or some other type of means for inputting data to computing device, including wireless devices. Further, each of the computing devices may be connected to one or more display devices, such as a monitor or any other visual and/or audiovisual output device, including wireless devices.

Processor 101 may include a number of modules or applications for performing various functions. These modules or applications may be software-enabled or computerized. For example, as further described below with reference to FIG. 2, processor 101 may include a data processing module 205, as well as a comparison matrix module 210, a data importation rule module 215, and a listing module 220.

In the example of FIG. 1, server 100 receives data from exhibition data feeds 170a-170n and optionally from entertainment data feeds 180a-180n, and may communicate with database 110 to retrieve and store data. Database 110 may comprise any conventional database management system. Examples include, but are not limited to, an Oracle® relational database management system, a Microsoft® SQL Server, and Sybase®. In one embodiment, database 110 is configured to perform various functions, such as data retrieval or calculations.

Consistent with embodiments of the invention, electronically received data may be filtered and mapped by data interface 105 before being processed by processor 101. Specifically, data interface 105 may map data from exhibition data feeds 170a-170n and entertainment data feeds 180a-n in accordance with data references (e.g., entertainment identification information, etc). Processing may include formatting data to ensure consistency with the specified data format(s), resolving missing data, flagging data inconsistencies or errors, and mapping data to associate it with the entertainment and/or exhibition. Data interface 105 may filter, map, and load data from exhibition data feeds 170a-170n and/or entertainment data feeds 180a-180n by utilizing a data loading tool, such as Informatica®. Further, data interface 105 may comprise a job scheduling tool, such as AUTOSYS®, that periodically initiates the data filtering, mapping, and loading. Data interface 105 may also directly upload static data files into database 110. Moreover, data interface 105 may replicate data into database 110 from other systems using replication technology, such as Sybase® DirectConnect Replication.

As stated above, processor 101 processes data provided from exhibition data feeds 170a-170n and entertainment data feeds 180a-180n. Further, processor 101 provides exhibition listings for users 120 based on user-selected or selected criteria (e.g., location information, exhibition time, entertainment name, entertainment type, entertainment rating, entertainment release date, and entertainment price) entered by users 120a-120n or otherwise specified.

In accordance with still further embodiments of the invention, authorized users may generate reports using processor 101 and/or database 110. Reports may be generated or otherwise provided on a periodic basis, such as hourly, daily, weekly, or any pre-defined period of time. Reports may also be generated on-demand or an ad-hoc basis. The report generation and ad-hoc query capabilities may be provided by a reporting tool, an example of which is Business Objects® products by Web Intelligence®. Browser-based user interfaces, including rules and options entry forms, alerts, and reports, may be developed using high-level programming languages such as Java®, C#, or ASP+. Further, browser-based user interfaces may be deployed on servers such as a WebSphere application server and Apache HTTP server.

In one embodiment, browser-based displays of sales data, or a dashboard display, may be grouped by entertainment identification information, exhibition location, and the like, and provide authorized users with the capability to view the sales data. Further, authorized users may be capable of viewing data in pre-defined report formats. Authorized users may also generate historic reports based on stored data and selection criteria such as entertainment identification information, exhibition location, and the like.

System administrator 115 may have various administrative responsibilities over the automated system 10, such as maintaining the mapping and filtering capabilities and/or other options in data interface 105, maintaining the data stored in database 110, and maintaining access rights and privileges of users. System administrator 115 may administer exhibition data, including identifying exhibition data issues and communicating with the proprietors of exhibition data feeds 170a-170n to resolve data issues or errors. System administrator 115 may also administer entertainment data, including identifying entertainment data issues and communicating with the proprietors of entertainment data feeds 180a-180n to resolve data issues or errors.

In one embodiment, administrator 115 and/or authorized user(s) may override entertainment and/or exhibition data using data override functionality. Data override allows a user, such as administrator 115 or an authorized user, to supplement or override entertainment and/or exhibition data by specifying specific data such as entertainment name, customization information, exhibition price, exhibition availability, and the like.

Figure 2:
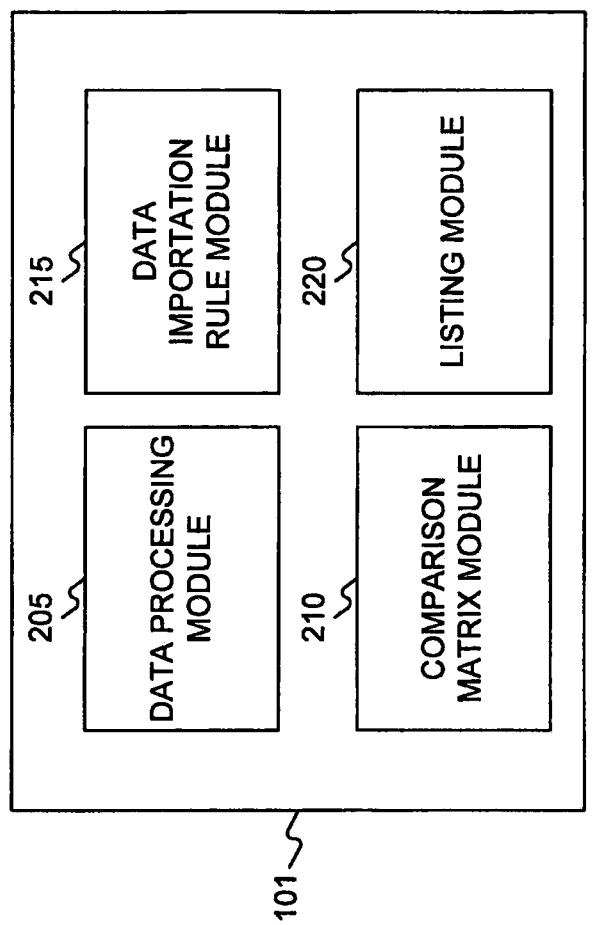
FIG. 2 is a detailed diagram of an exemplary configuration of a processor.

Referring to FIG. 2, a detailed diagram of an exemplary configuration of processor 101 is provided. As shown in FIG. 2, processor 101 includes data processing module 205 and listing module 220, and may include comparison matrix 210 and data importation rule module 215. Each of these modules or components may be implemented with software.

Data processing module 205 receives and processes user data (e.g., a location information, an exhibition time, an entertainment name, an entertainment type, an entertainment rating, an entertainment release date, an entertainment price, and the like) entered by users 120 or otherwise specified. Data processing module 205 also receives and processes the exhibition data, and, optionally, the entertainment data. The exhibition data may be received and processed based on the data importation rules (e.g., data scripts, lookup tables, stored procedures) defined by the authorized users and stored in data importation rule module 215. Data processing 205 may be initialized or scheduled to receive and process the exhibition data or the entertainment data at predetermined intervals (e.g., hourly, daily, weekly) or substantially simultaneously with the receipt of user-entered data.

The received data may further be filtered, mapped, and/or otherwise processed in accordance to a comparison matrix stored in comparison matrix module 210. For example, as described below and illustrated, processor 100 and/or data interface 105 may use the comparison matrix to process data from exhibition data feeds 170a-170n and/or entertainment data feeds 180a-180n. Such processing may normalize the data, eliminate duplicates in the data, and catch exceptions or errors.

Listing module 220 provides a listing the exhibition data to users 120a-n. In one embodiment, listing module 220 electronically presents the exhibition data to users 120a-120n via one or more customized graphical user interfaces (GUIs) having entertainment-specific interfaces (e.g., movie sound clips, movie background, movie special characters), as described below and illustrated in FIGS. 5A-C. A browser or similar software may be used to display the GUIs on the computing device of users 120a-n.

In one embodiment, templates are provided for collecting and listing entertainment and/or exhibition data, and offering to sell entertainment tickets. Templates may include any combination of data display fields, graphics, data entry fields, drop-down windows, selection boxes and other fields to enable exhibition and/or entertainment data to be displayed to users 120 or selected by users 120. The layout of a template for each type of entertainment (e.g., movies, concerts, art shows, museum exhibits, sporting events) may be uniform or standardized so that data providers electronically sends the exhibition and/or entertainment data in a proper format.

Figure 3:
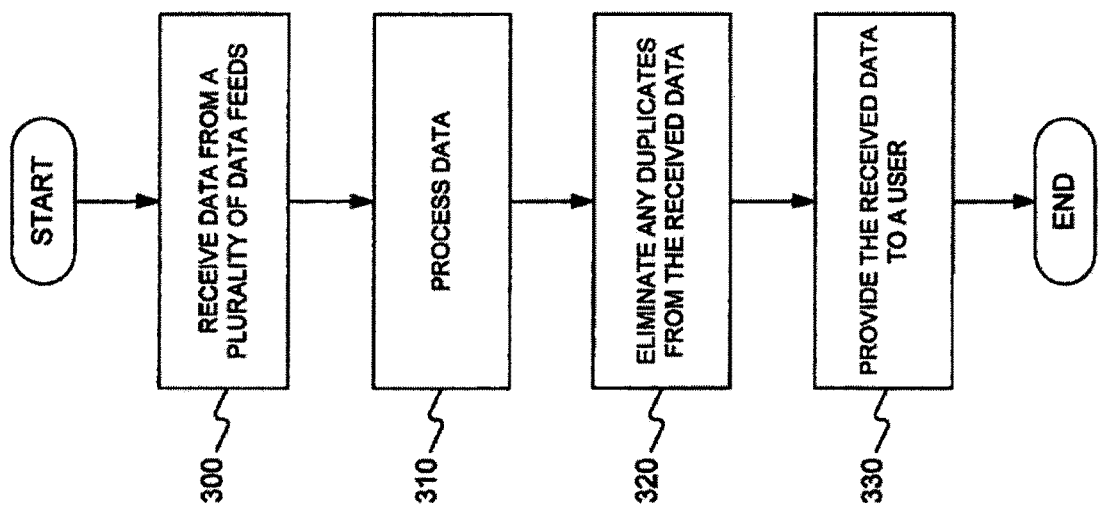
FIG. 3 shows a flow diagram of an exemplary method for offering to sell entertainment tickets over a network.

FIG. 3 shows a flow diagram of an exemplary method for collecting and listing entertainment and/or exhibition data from multiple data sources. At the start of the process indicated in stage 300, server 100 of system 10 receives data from one or more data sources (e.g., authorized users, exhibition data feeds 170, or entertainment feeds 180). Feed specifications may be provided to ensure that the data is sent in the proper format. Server 100 may receive the data on a periodic basis (e.g., hourly, daily, or weekly), on demand, or substantially in real-time. Further, server 100 may receive the data via network 160. Server 100 may also receive the data through a direct upload of static data or by using a replication process (e.g., Sybase DirectConnect Replication).

In stage 310, server 100 may process the data by using data interface 105 and/or data processing module 205 to prepare the data for duplicate elimination in stage 320. By way of example, data interface 105 and/or data processing module 205 may process the data utilizing a data loading tool (e.g., Informatica). As described above, data interface 105 and/or data processing module 205 may filter the data to ensure the quality of the data and catch data errors. Examples of data errors feed data include an exhibition that is associated with the wrong entertainment, an invalid exhibition location, and the like. In some cases, data interface 105 and/or data processing module 205 may use existing data to resolve errors in the entertainment and/or exhibition data. In other cases, the data errors may be unresolved and, as a result, the invalid data is discarded. Data feeds found to be valid may be mapped to associate, for example, the exhibition data with the correct entertainment data. All processed data may be stored in database 110 or streamed directly to users 120.

Figure 4:
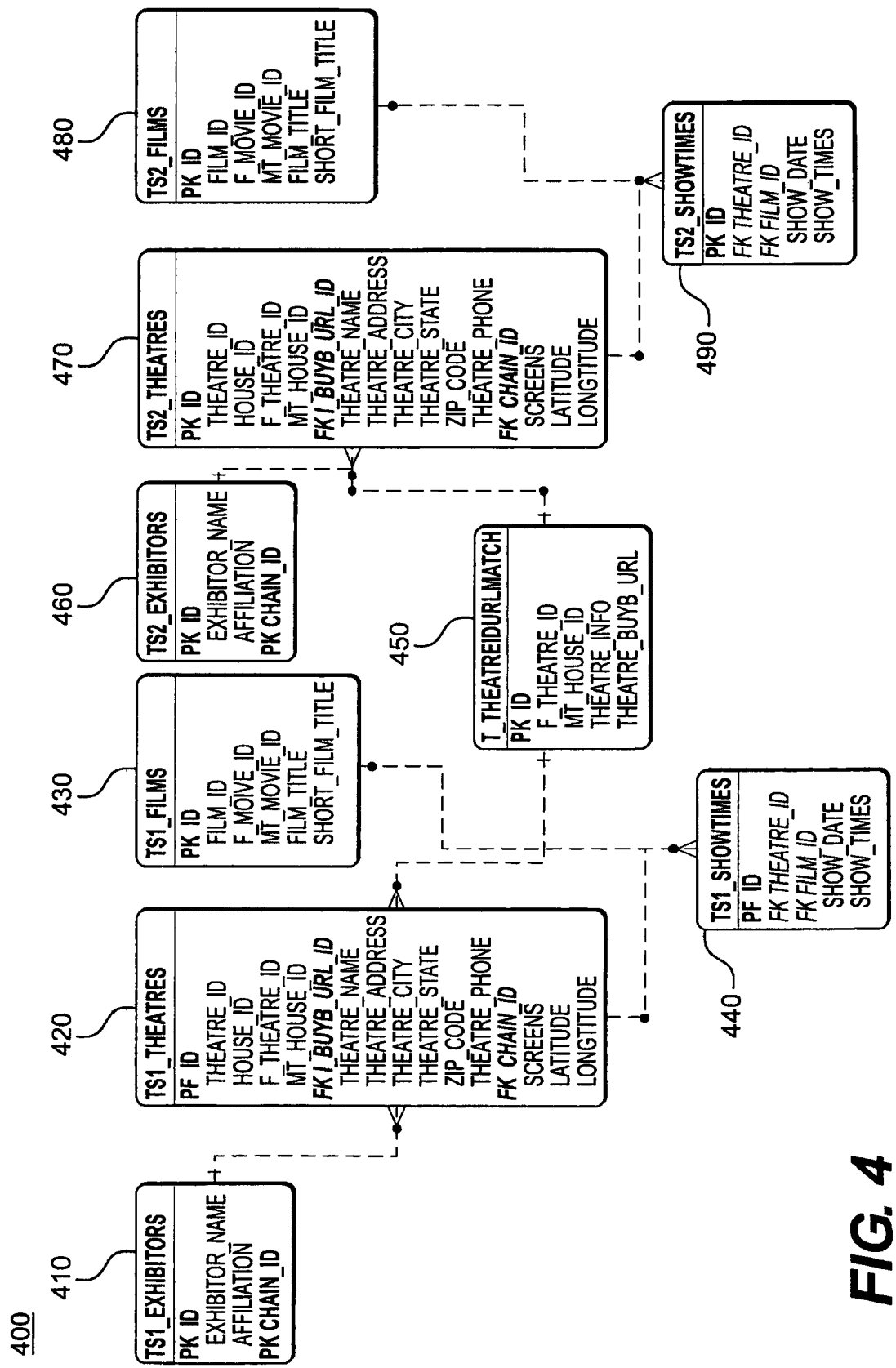
FIG. 4 shows an exemplary database schema for storing the exhibition data and eliminating duplicates in the exhibition data.

Next, in stage 320, processor 101 and/or data interface 105 eliminates any duplicates in the exhibition data in accordance to the comparison matrix in comparison matrix 210. The exemplary duplicate elimination process may eliminate, for example, duplicate movies or duplicate movie locations according to the comparison matrix. An exemplary comparison matrix is described in greater detail below with reference to an exemplary database schema 400 as illustrated in FIG. 4. Exemplary database schema 400 stores the exhibition data for movie exhibitions, and includes exhibitor tables 410 and 460, theater tables 420 and 470, film tables 430 and 480, show times tables 440 and 490, and a duplicate theater table 450.

The comparison matrix may first search duplicate theater table 450 to determine which theaters, as stored in theater tables 420 and 470, are duplicates. Next, the comparison matrix may compare ZIP® codes and city+state of theaters in theater tables 420 and 470. If the ZIP® codes and the city+state of theaters in theater tables 420 and 470 match, the comparison matrix may compare names, phone numbers, and street addresses of theaters in theater tables 420 and 470. If any of the theaters' names, phone numbers, and street addresses match, then the theaters may be considered to be duplicates. All or some of the theaters found to be duplicates may be eliminated from the exhibition data.

Figure 5A:
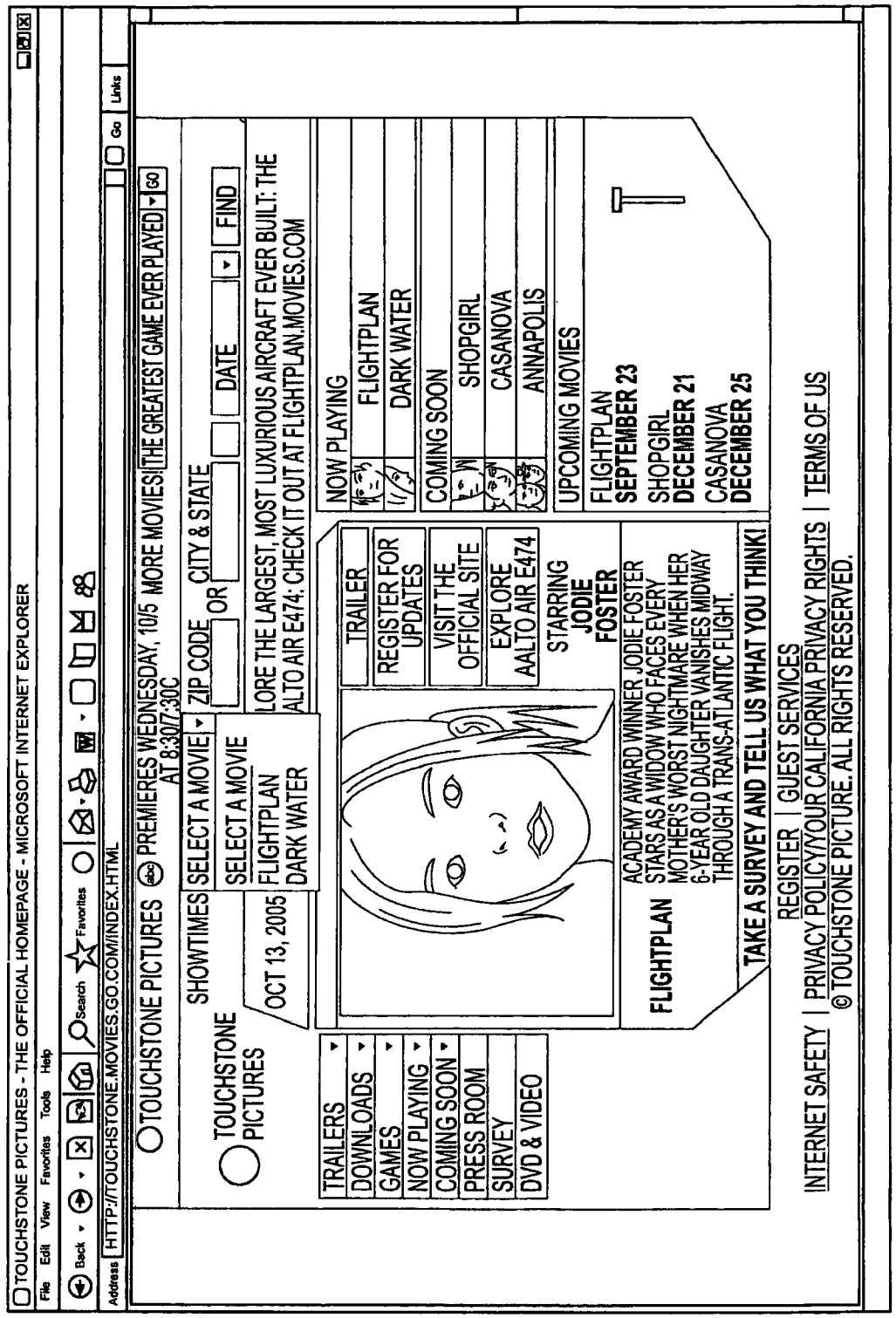
Figure 5B:
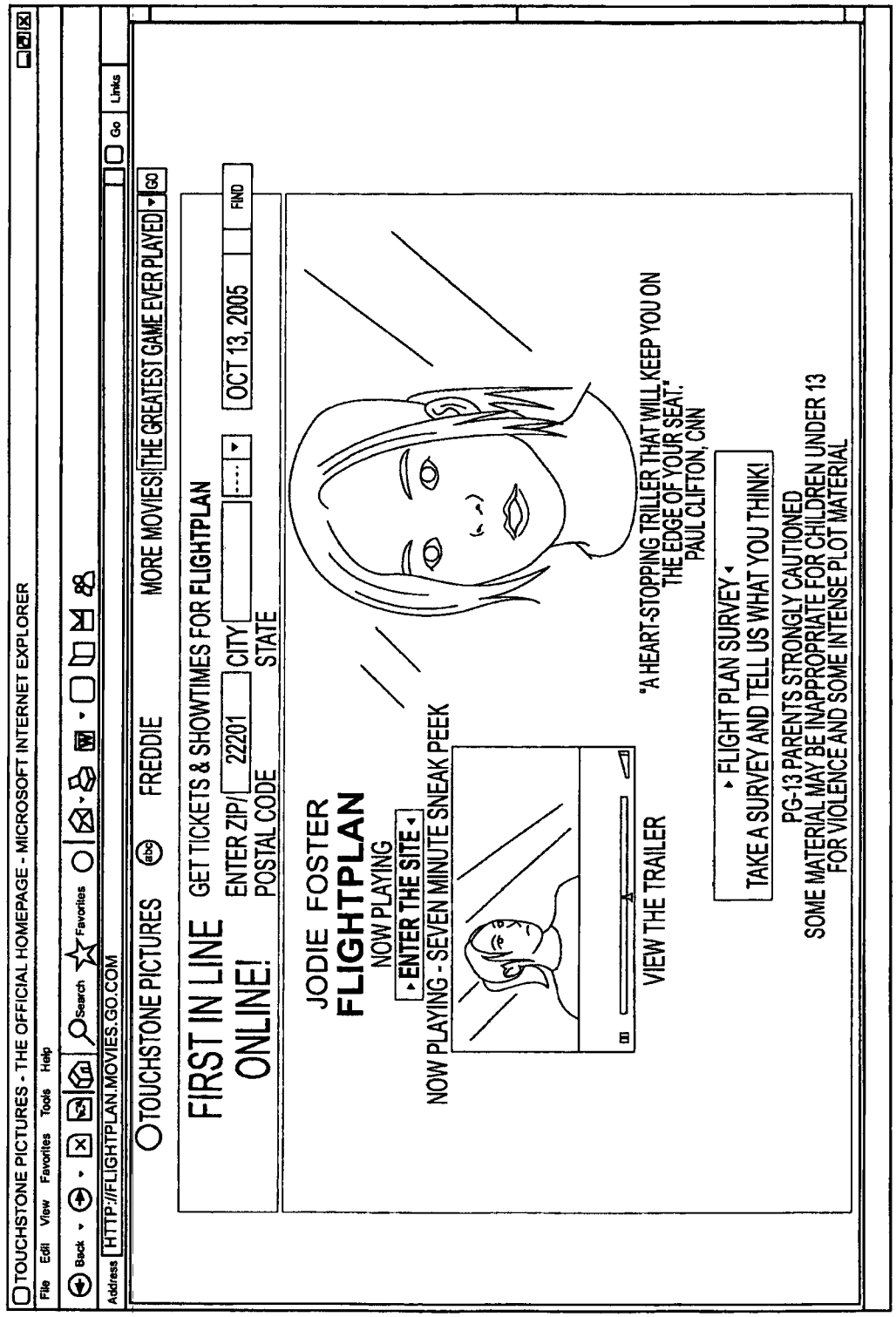
Figure 5C:
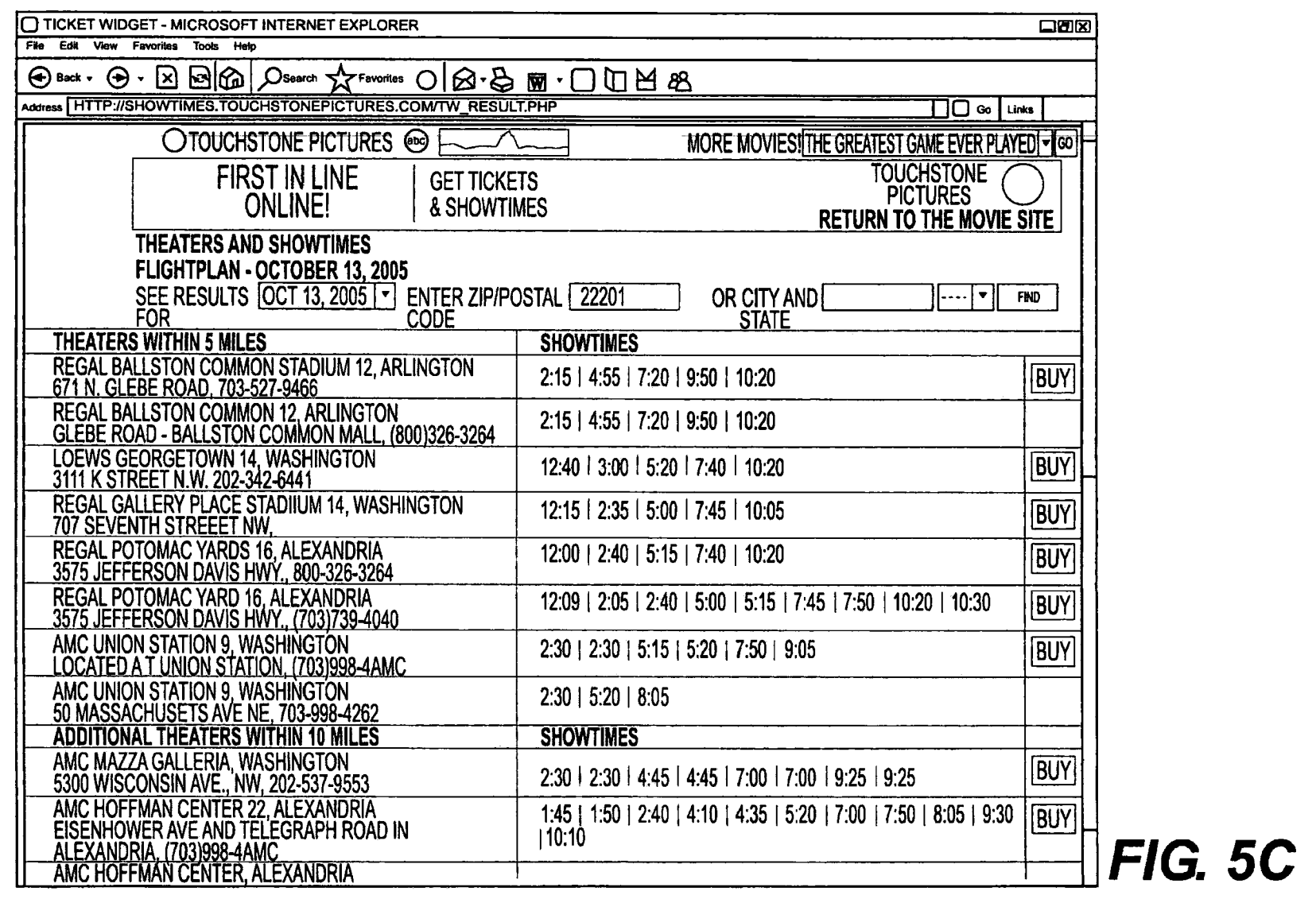

In stage 330, listing module 220 in processor 101 provides one or more listings of entertainment exhibitions based on the exhibition data and/or entertainment data received and processed in stages 300-320. As illustrated in FIGS. 5A and 5B, users 120 may select an entertainment (e.g., a movie) and enter user-selected criteria (e.g., ZIP® code, city and state name, exhibition date). In accordance with the user-selected criteria and other selected criteria, listing module 220 provides a listing of exhibitions and an option to purchase one or more exhibition tickets from an entertainment ticket provider, an example of which is illustrated in FIG. 5C. The listing of exhibitions may be randomized in relation to one or more criteria, such as the entertainment ticket provider (e.g., Fandango™, MovieTickets™), the exhibition data feeds (e.g., Tribune Media, Cinema Source), and the exhibition location (e.g., movie theater). When users 120 select the option to purchase one or more exhibition tickets, users 120 are directed to the entertainment ticket provider.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software, but the present invention may be implemented as a combination of hardware and software or in hardware alone. Further, while certain exemplary methods have been described, it will be appreciated that the order of the method may be rearranged and stages or steps may be substituted, modified, combined or otherwise altered.

Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

Other embodiments of the invention will be apparent to those skilled in the art from consideration of the specification and practice of the invention disclosed herein. Therefore, the specification and examples should be considered as exemplary only, with a true scope and spirit of the invention being indicated by the following claims.

What is claimed is:

1. A computer-implemented method for displaying a list of available entertainment offerings, the method comprising:

receiving, over a network connection at a computing device, a plurality of data feeds from two or more providers, each of the plurality of data feeds comprising a data format and the data feeds carrying data including entertainment identification information relating to entertainment offerings for an entertainment exhibition from the two or more providers;

processing, using a processor of the computing device, the data from the plurality of data feeds into a display listing having one or more specified data formats provided on a display device of the computing device based on data importation rules and in accordance with at least one user-selected criterion, wherein the processing based on the data importation rules includes formatting data of the plurality of data feeds from the two or more providers such that the data is consistent with the one or more specified data formats, wherein the data formats of the plurality of data feeds are different than the one or more specified data formats and wherein the formatting comprises converting the data formats of the plurality of data feeds to the one or more specified data formats;

presenting, on the display device of the computing device, a user interface displaying the listing and having an option to purchase entertainment included in the listing from each of the two or more providers; and responsive to receiving, via the user interface, a user selection from the listing, directing the computing device to access a provider system of a provider associated with the user selection;

wherein the directing causes the computing device to receive information of the provider system over the network connection and load the information at the computing device for purchasing the entertainment.

2. The method of claim 1, wherein at least one of the data feeds includes data relating to one of a show and a movie.

3. The method of claim 1 further comprising:

receiving a second user selection of a future entertainment exhibition from the listing; and providing access to a third-party provider of the future entertainment exhibition based on the second user selection.

4. The method of claim 3, wherein the third-party provider provides permission to access the future entertainment exhibition.

5. The method of claim 4, wherein the permission to access comprises a ticket.

6. The method of claim 5 further comprising: mapping entertainment exhibition data of an individual provider included in one of the plurality of data feeds to entertainment data of a studio; and providing the entertainment data of the individual provider and the entertainment data of the studio in an entertainment-specific interface to the user.

7. The method of claim 1 wherein the data importation rules comprise at least one of data scripts, lookup tables, and stored procedures.

8. The method of claim 1 wherein the at least one user-selected criterion comprises entertainment name.

9. A non-transitory computer-medium storing instructions that, when executed by a processor of a computing device, perform a method for displaying a list of available entertainment offerings, the method comprising:

receiving, over a network connection at the computing device, a plurality of data feeds from two or more providers, each of the plurality of data feeds comprising a data format and the data feeds including entertainment identification information relating to entertainment offerings for an entertainment exhibition from the two or more providers;

processing, using the processor, the data from the plurality of data feeds into a display listing having one or more specified data formats provided on a display device of the computing device based on data importation rules and in accordance with at least one user-selected criterion, wherein the processing based on the data importation rules includes formatting data of the plurality of data feeds from the two or more providers such that the data is consistent with the one or more specified data formats, wherein the data formats of the plurality of data feeds are different than the one or more specified data formats and wherein the formatting comprises converting the data formats of the plurality of data feeds to the one or more specified data formats; and presenting, on the display device, a user interface displaying the listing and having an option to purchase entertainment included in the listing from each of the two or more providers; and responsive to receiving, via the user interface, a user selection from the listing, directing the computing device to access a provider system of a provider associated with the user selection;

wherein the directing causes the computing device to receive information of the provider system over the network connection and load the information at the computing device for purchasing the entertainment.

10. A system for displaying a list of available entertainment offerings, the system comprising:

a receiver configured to receive, over a network connection, a plurality of data feeds, each of the plurality of data feeds comprising a data format and the data feeds including an entertainment identification information relating to entertainment offerings for an entertainment exhibition from the two or more providers;

a processor configured to process data from the plurality of data feeds into a display listing having one or more specified data formats provided on a display device based on data importation rules and in accordance with at least one user-selected criterion, wherein processing based on the data importation rules includes formatting data of the plurality of data feeds from the two or more providers such that the data is consistent with the one or more specified data formats, wherein the data formats of the plurality of data feeds are different than the one or more specified data formats and wherein the formatting comprises converting the data formats of the plurality of data feeds to the one or more specified data formats;

an output unit configured to effectuate presentation of a user interface on the display device, the user interface displaying the listing and having an option to purchase entertainment included in the listing from each of the two or more providers; and responsive to receiving, via the user interface, a user selection from the listing, the processor is configured to direct a computing device to access a provider system of a provider associated with the user selection;

wherein the directing by the processor causes the computing device to receive information from the provider system over the network connection and load the information on the computing device for purchasing the entertainment.

\* \* \* \* \*